United States Patent [19]

Bailey et al.

[11] 4,404,173

[45] Sep. 13, 1983

[54] APPARATUS FOR CONTACTING SUBSTANTIALLY IMMISCIBLE LIQUIDS

[75] Inventors: Ernst C. Bailey, Lakeland; William E. Vickers, Brandon; Donald B. Stain, Lakeland, all of Fla.

[73] Assignee: UNC Recovery Corporation, Mulberry, Fla.

[21] Appl. No.: 190,266

[22] Filed: Sep. 24, 1980

[51] Int. Cl.³ .......................... B01D 11/04; B01F 5/00
[52] U.S. Cl. ..................... 422/257; 137/270; 137/625.4; 210/207; 239/193; 239/194; 239/413; 239/414; 239/420; 366/150; 366/177; 366/182; 366/193; 422/258; 422/259; 422/273
[58] Field of Search ................ 422/257–259, 422/273; 239/193, 194, 420, 413, 414; 366/150, 177, 182, 193; 210/207; 137/270, 625.4

[56] References Cited

U.S. PATENT DOCUMENTS

| | | | |
|---|---|---|---|
| 1,078,588 | 11/1913 | McElwaine | 239/413 |
| 1,510,183 | 9/1924 | MacDonald et al. | 239/194 |
| 2,754,179 | 7/1956 | Whatley | 422/259 |
| 3,206,288 | 9/1965 | Hazen et al. | 422/258 |
| 3,286,992 | 11/1966 | Armeniades et al. | 259/4 |
| 3,664,638 | 5/1972 | Grout et al. | 259/4 |
| 3,704,006 | 11/1972 | Grout et al. | 259/4 |
| 3,750,955 | 8/1973 | Nakai et al. | 239/420 |
| 3,775,063 | 11/1973 | Grout et al. | 23/283 |
| 3,800,985 | 4/1974 | Grout et al. | 222/146 H |
| 3,806,097 | 4/1974 | Devellian et al. | 259/4 |
| 3,844,723 | 10/1974 | Takahata et al. | 422/259 |
| 3,860,217 | 1/1975 | Grout | 259/4 |
| 3,862,022 | 1/1975 | Hermann | 204/272 |
| 3,917,811 | 11/1975 | Grout et al. | 423/659 |
| 3,922,220 | 11/1975 | Middleman et al. | 210/23 |
| 4,277,445 | 7/1981 | De Schepper et al. | 422/259 |

FOREIGN PATENT DOCUMENTS

| | | | |
|---|---|---|---|
| 46831 | 3/1911 | Austria | 239/413 |
| 696114 | 8/1953 | United Kingdom | 422/259 |
| 428759 | 11/1974 | U.S.S.R. | 422/258 |

*Primary Examiner*—Barry S. Richman
*Attorney, Agent, or Firm*—Fleit, Jacobson & Cohn

[57] ABSTRACT

An improved method and apparatus for producing a dispersion of substantially immiscible liquids which employs a conduit having an upstream section divided into first and second channels of variable length and a downstream section for mixing the liquids. The apparatus also includes means for varying the length of the first and second channels and means for flowing the liquids separately through the channels whereby the liquids mix in the downstream section of the conduit to form the dispersion. In accordance with one embodiment, a conventional mixer-settler is modified to include the conduit mounted at an upstream end of the settling chamber so that its inlet is adjacent the mixing chamber and its outlet is approximately at the same height as the organic-aqueous interface in the settling chamber. In accordance with this arrangement, the liquids flow through separate channels of the conduit, are mixed in the downstream section of the conduit, and flow into the settling chamber where the phases are allowed to separate.

9 Claims, 4 Drawing Figures

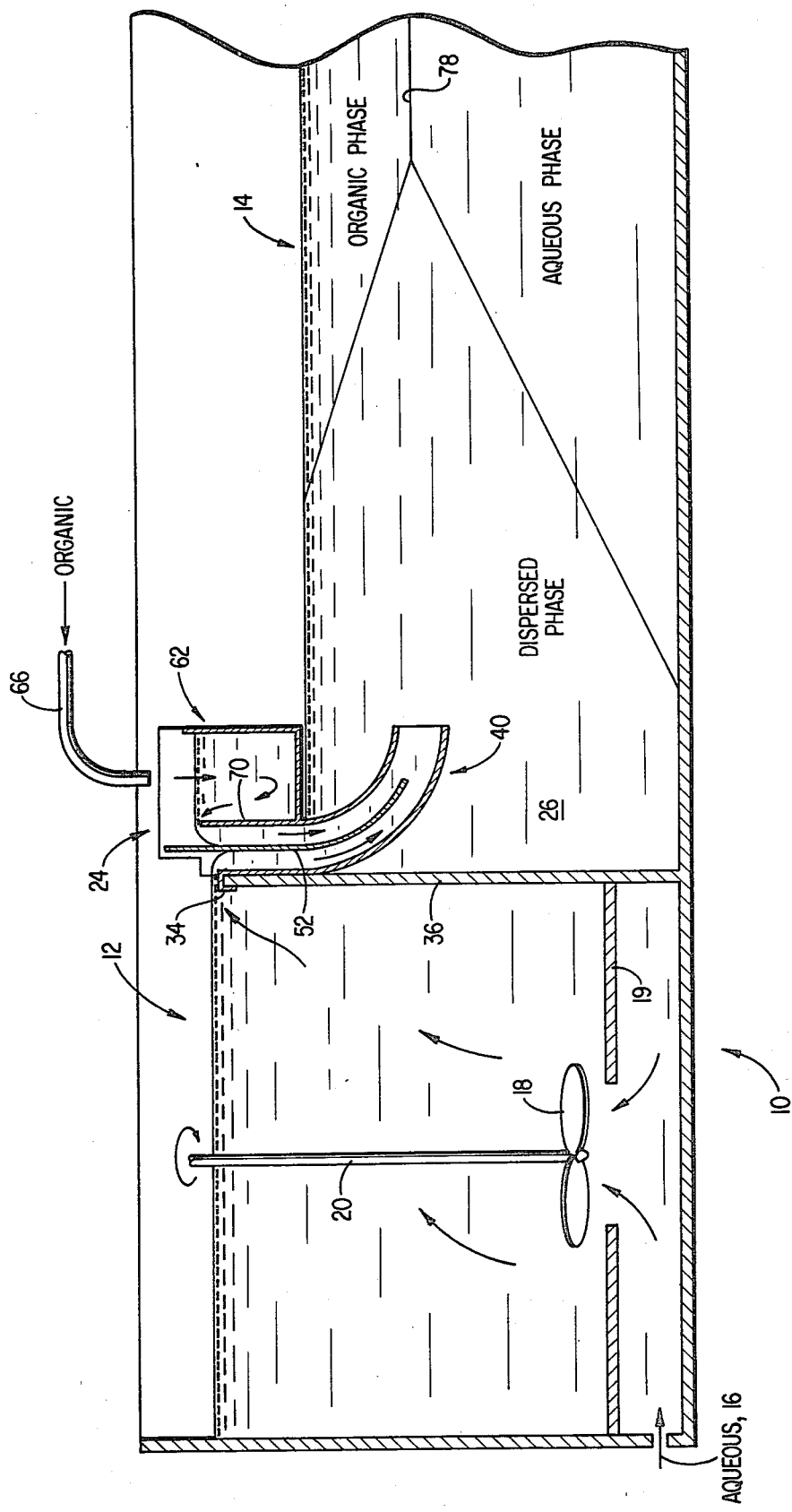

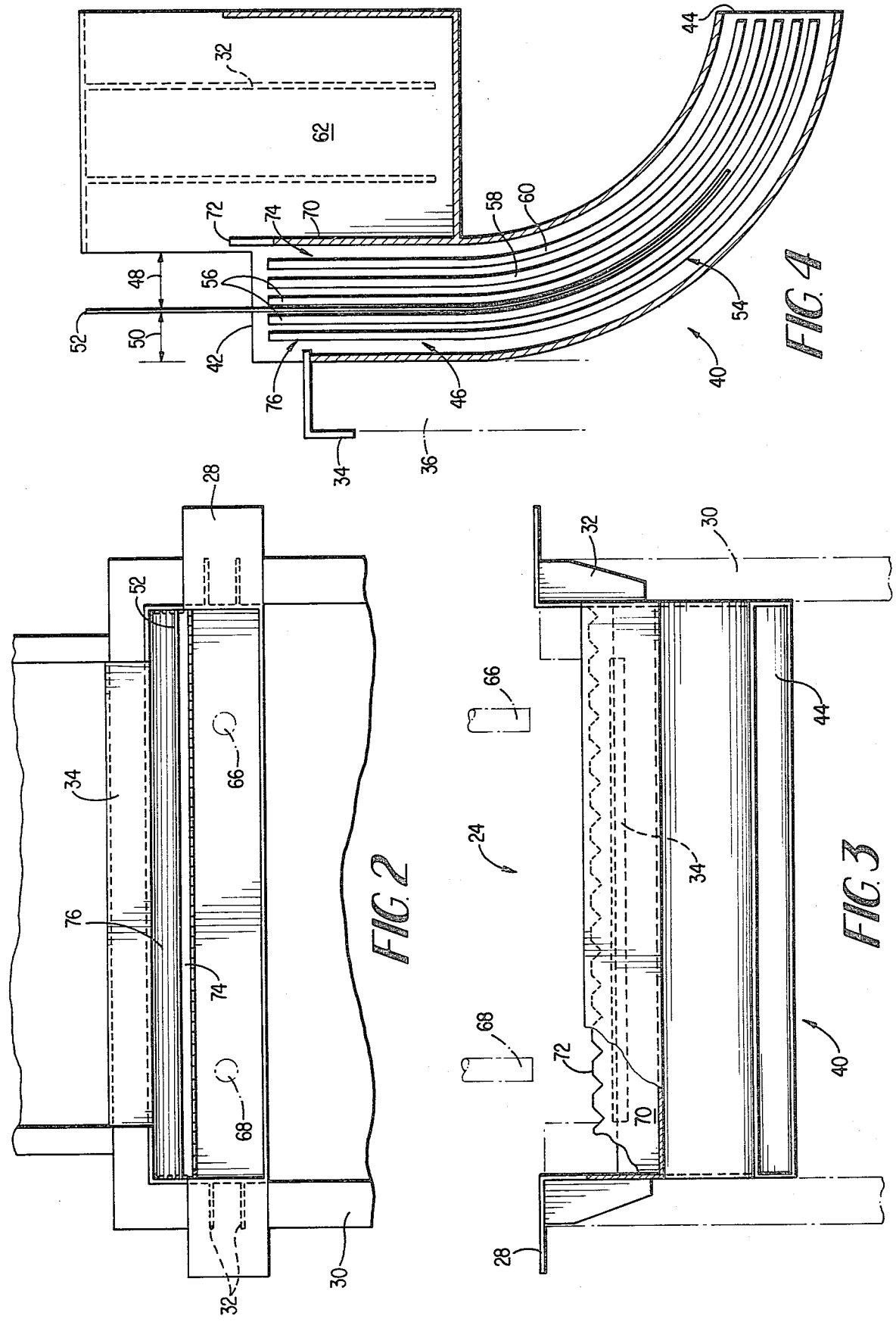

4,404,173

APPARATUS FOR CONTACTING SUBSTANTIALLY IMMISCIBLE LIQUIDS

BACKGROUND OF THE INVENTION

This invention relates to a method for producing a dispersion of substantially immiscible liquids. More specifically, this invention relates to the liquid-liquid extraction of uranium from phosphoric acid produced by the acidulation of phosphate rock.

There are many chemical processes which involve the contacting of substantially immiscible liquids to form a dispersion. A chemical process of this type is liquid-liquid extraction. For example, in the recovery of uranium from wet-process phosphoric acid, the wet-process acid is contacted with an organic extractant to extract uranium from the acid. The pregnant extractant is then typically contacted with an aqueous stripping solution to strip uranium from the extractant.

There have been many proposals in the prior art of methods for contacting two substantially immiscible liquids such as in the liquid-liquid extraction of metal values. In the liquid-liquid extraction art, the organic extractant and the aqueous solution are commonly contacted in a mixer-settler. A mixer-settler typically includes a mixing chamber and a settling chamber in which liquid in the mixing chamber overflows into an upstream end of the settling chamber. The organic extractant and the aqueous solution are normally mixed in the mixing chamber and then overflow into the settling chamber where the phases are allowed to separate.

While mixer-settlers have found wide acceptance in the liquid-liquid extraction art, a mixer-settler is not ideally suited for all applications. This is particularly true in applications in which there is a tendency to form stable emulsions. One area in which the formation of stable emulsions can present a problem is in the recovery of uranium from wet-process phosphoric acid.

A large portion of commercial phosphate production is converted first to a relatively dilute phosphoric acid by the so-called "wet process" (as distinguished from the furnace process which produces elemental phosphorus by direct reduction of the ore). The producer first manufactures sulphuric acid, then uses it to digest the rock. The chemical reaction forms phosphoric acid and calcium sulphate. The latter is filtered out leaving an impure acid stream typically containing about 30% $P_2O_5$. The 30% acid is generally evaporated to about 54% "merchant acid". The higher the acid concentration, the harder it is to extract the uranium, so the 30% stage is where the uranium extraction must take place.

All phosphate rock contains measurable amounts of organic material such as humic acids. For example, Florida phosphate rock contains as much as 0.1% and more organic material. When phosphate rock containing solid organic material is acidulated with sulphuric acid, the aqueous phase takes up the solid organic material which is of such small particle size that much of it passes through the gypsum filter.

The organic material, or black particulate, causes emulsions during uranium extraction. In particular, these emulsions will collect at the organic-aqueous interface in any solvent extraction process that utilizes an organic extractant. The volume of emulsion generated is often such that flooding occurs and the equipment must be shut down and cleaned out to remove the emulsion.

While a number of processes have been developed for removing a substantial portion of the solid organic material, residual solid organic material as well as residual inorganic solids are in the wet-process acid at the time of extraction. These and other impurities may cause an unacceptably large volume of stable emulsions during uranium extraction when employing many liquid-liquid contacting means such as mixer-settlers.

Accordingly, it is an object of the present invention to provide an improved method and apparatus for producing a dispersion of substantially immiscible liquids.

A further object of the invention is to provide an improved method and apparatus for producing a dispersion of substantially immiscible liquids which minimizes the formation of stable emulsions.

Yet a further object of the invention is to provide an improved method and apparatus for the liquid-liquid extraction of metal values employing an organic extractant.

A still further object of the invention is to provide an improved method and apparatus for recovering uranium from wet-process phosphoric acid.

SUMMARY OF THE INVENTION

The present invention provides an improved method and apparatus for producing a dispersion of substantially immiscible liquids. The apparatus includes a conduit having an upstream section divided into first and second channels of variable length and a downstream section for mixing the liquids. The apparatus also includes means for varying the length of the first and second channels. The apparatus also includes means for flowing the liquids separately through the channels whereby the liquids mix in the downstream section of the conduit to form the dispersion. Preferably, the apparatus also includes means for varying the width of the first and second channels to maintain constant velocities while changing the volume ratio of the liquids mixed in the downstream section of the conduit.

In accordance with one embodiment of the invention, a conventional mixer-settler is modified to incorporate the conduit for mixing the substantially immiscible liquids. The conduit is mounted at an upstream end of the settling chamber so that its inlet is adjacent to the mixing chamber and its outlet is at approximately the same height as the organic-aqueous interface in the settling chamber. In a conventional mixer-settler, the mixing chamber is used to contact or mix the liquids. In accordance with the modified mixer-settler of the present invention, the mixing chamber is simply used as a pump so that the liquid overflows into the inlet of the second channel of the conduit. Separate means are provided for supplying the other liquid into the inlet of the first channel of the conduit. In accordance with this arrangement, the liquids flow through separate channels of the conduit and are mixed in the downstream section of the conduit. The liquids then flow into the settling chamber where the phases are allowed to separate.

The present invention is an improvement over many liquid-liquid contacting means such as mixer-settlers. More particularly, it has been found that the degree of mixing in the mixing chamber of a conventional mixer-settler tends to generate an unacceptably large volume of stable emulsions. Moreover, the degree of mixing is relatively difficult to control. By contrast, in accordance with the present invention, the degree of mixing can be minimized to avoid the generation of a large volume of stable emulsions and can be simply and easily varied and controlled. In accordance with the invention, the liquids flow through separate channels of the conduit and then combine and mix in the downstream section of the conduit. The amount of mixing can be controlled by varying the length of the first and second channels to change the length of the downstream section of the conduit wherein the liquids are mixed. The amount of mixing carried out is proportional to the product of the degree of mixing multiplied by the time of mixing. The time of mixing is proportional to the length of the downstream section of the conduit multiplied by the combined velocity of the immiscible liquids flowing through it. The degree of mixing is proportional to the turbulence of the two phases passing through the downstream section of the conduit. Also, the width of the first and second channels can be varied to maintain velocities constant while changing the volume ratio of the liquids mixed in the downtream section of the conduit.

BRIEF DESCRIPTION OF THE DRAWINGS

FIG. 1 is a partial schematic, vertical, cross-sectional view of a conventional mixer-settler modified to include a diverter assembly in accordance with the present invention;

FIG. 2 is a plan view of the mixer-settler of FIG. 1;

FIG. 3 is a vertical end view of the diverter assembly of the present invention viewed from a downstream section of the settling chamber of the mixer-settler of FIG. 1; and FIG. 4 is an exploded, vertical, cross-sectional view of the diverter assembly of FIG. 1.

DESCRIPTION OF THE PREFERRED EMBODIMENTS

Referring to the drawings, the mixer-settler 10 includes a mixing chamber 12 and a settling chamber 14. The mixing chamber 12 has an inlet 16 near the bottom of the chamber. An impeller 18 or the like is mounted in the mixing chamber 12 above a partial divider 19 and is driven by means of a shaft 20 connected to a motor (not shown).

The mixer-settler 10 also includes a diverter assembly 24. The diverter assembly 24 is mounted at an upstream end 26 of the settling chamber 14 by flanges 28 which are supported by the longitudinal walls 30 of the settling chamber 14. The diverter assembly 24 also includes supports 32 which fits into slots (not shown) in the longitudinal walls 30 of the settling chamber 14. The diverter assembly also has a flange or angle iron 34 which fits over the transverse wall 36 separating the mixing chamber 12 from the settling chamber 14 so that the diverter assembly 24 is retained adjacent to the mixing chamber 12.

The diverter assemebly includes a conduit 40 which extends substantially the complete width of the settling chamber 14. The conduit 40 is curved to form a 90° bend between its inlet 42 and its outlet 44. The upstream section 46 of the conduit 40 is formed into a first channel 48 and a second channel 50 by a divider plate 52, preferably formed of flexible sheet metal. The conduit also includes a downstream section 54 for mixing the liquids.

The divider plate 52 dividing the upstream section 46 of the conduit 40 into the channels 48,50 has essentially the same curvature as the upstream section 46 of the conduit 40 in which it is mounted. The divider plate 52 extends across the complete width of the upstream section 46 of the conduit 40 so that the channels 48,50 comprise flow passages which are essentially completely isolated from one another. The divider plate 52 is mounted in the conduit 40 by mounting brackets 56 so that the divider plate 52 can be moved longitudinally of the conduit 40 to change the length of the channels 48,50 and therefore the length of the downstream section 54 of the conduit 40 in which the liquids are mixed.

The conduit 40 also is provided with additional mounting brackets 58,60 positioned and adapted to be used to change the width of the channels 48,50. By changing the width of the channels 48,50, the velocities can be maintained constant while changing the volume ratio of the liquids mixed in the downstream section 54 of the conduit 40. As illustrated, the downstream section 54 of the conduit 40 is unobstructed. It should be understood, however, that the downstream section 54 can be packed with Berl saddles or the like to increase the contact between the liquids.

The diverter assembly 24 also includes a feed chamber 62. The feed chamber 62 is basically a rectangular-shaped tank for receiving one of the substantially immiscible liquids. The feed chamber 62 has inlets 66,68 for feeding one of the substantially immiscible liquids into the tank. The feed chamber 62 also includes a weir 70 which defines one wall of the feed chamber 62 and extends across the entire width of the feed chamber 62. Preferably, the weir 70 has a sawtooth pattern 72 at its upper edge for evenly distributing liquid into the inlet 74 of the first channel 48 which is adjacent to the inlet 76 of the second channel 50.

The downstream section 54 of the settling chamber 14 is not illustrated. The downstream section 54 is conventional and is arranged to disengage the organic and aqueous liquids after the phases have separated. The specific manner in which the liquids are disengaged is not related to the present invention and will depend on whether the contacting of the substantially immiscible liquids is conducted concurrently or countercurrently in a multi-stage system.

The operation of the mixer-settler 10 is as follows. One of the substantially immiscible liquids, preferably the aqueous liquid, is drawn through the inlet 16 of the mixing chamber 12 by the impeller 18 and is caused to overflow the mixing chamber 12 into the inlet 76 of the second channel 50 of the conduit 40. The other substantially immiscible liquid, normally the organic liquid, is fed into the feed chamber 62 through inlets 66,68 and overflows the weir 70 into the inlet 74 of the first channel 48. The fluids then flow in fluid isolation through their respective channels 48,50. The fluids meet at the ends of their respective channels 48,50 and mix in the downstream section 54 of the conduit 40. The mixture flows out of the conduit 40 at the outlet 44 at approximately the same height as the organic-aqueous interface in the settling chamber 14. By controlling the rotational speed of the impeller 18, the volume of the liquid flowing through the second channel 50 can be regulated. In similar manner, the volume of the liquid flowing through the first channel 48 can be regulated.

In order to facilitate an easier understanding of the invention, the operation of the mixer-settler 10 will now be described in relation to the recovery of uranium from wet-process phosphoric acid. More particularly, the invention will be described with reference to the extraction of uranium from wet-process phosphoric acid using a mixture of mono- and di-(alkylphenyl) acid phosphate esters. The mixed esters are a known extractant for uranium from wet-process phsphoric acid and have a favorable extraction coefficient ($E_a°$) for the extraction of tetravalent uranium. As is known, the coefficient of extraction ($E_a°$) is a measure of the extraction power of a reagent and is defined as the ratio of the concentration of uranium in the organic phase to the concentration of uranium in the aqueous phase at equilibrium. The preferred mixed esters are prepared from commercially available octylphenol or nonyl phenol. The preferred mixture is approximately an equimolar mixture of the mono- and di-esters.

The ester mixture is employed in an inert non-polar diluent such as aliphatic hydrocarbons, aromatic hydrocarbons, aromatic petroleum fractions, and chlorinated hydrocarbons. The extractant solution should contain from about 10 to 40% by volume, preferably about 20 to 30% by volume, of the ester mixture. In general, the volume ratio of the wet-process acid to the extractant should be about 5 to 7:1, with the preferred ratio being about 6:1. In addition, it is generally preferred to operate the extraction in the aqueous continuous mode.

In this type of uranium recovery process, pregnant mixed ester extractant is stripped of its uranium content by contacting the pregnant extractant with a phosphoric acid stripping solution. The phosphoric acid stripping solution can be either wet-process acid or phosphoric acid prepared from elemental phosphorus produced by the direct reduction of ore in the so-called furnace process to produce furnace grade or comparable acid. Before or during stripping, the uranium in the pregnant extractant is oxidized to the hexavalent state with a suitable oxidizing agent such as hydrogen peroxide. In general, the volume ratio of the extractant to the stripping solution should be about 6 to 10:1, with the preferred ratio being about 8:1. As in the extraction step, the stripping operation is preferably accomplished in the aqueous continuous mode.

The mixer-settler 10 described herein can be used in contacting the mixed ester extractant with the phosphoric acid in either or both of the extraction and stripping operations. In both of these operations, it is preferred to feed the acid through the mixing chamber so that the acid overflows into the inlet 76 of the second channel 50 of the conduit 40. In both of these operations, it also is preferred to feed the pregnant or barren organic extractant into the feed chamber 62 of the diverter assembly 24 so that the organic extractant overflows the weir 70 into the inlet 74 of the first channel 48. The acid and the organic extractant are mixed in the downstream section 54 of the conduit 40 resulting in a transfer of uranium between the acid and the organic extractant. The mixture is then discharged approximately at the same height as the organic-aqueous interface 78 in the settling chamber 14. Both the extraction and stripping are preferably conducted in a multi-stage system in which the overall volume ratio of the extractant to the acid is as defined above. The acid is recycled intra-stage in conventional manner to maintain the mixing in the aqueous continuous mode.

In a typical extraction or stripping stage, the acid flow rate through the second channel 50 will be about 7½ gallons per minute and the organic extractant flow rate through the first channel 48 will be about 60 gallons per minute. Using these flow rates, the dispersion which is formed in the downstream section 54 of the conduit is a dispersion of the organic extractant in the acid. In other words, the mixing is conducted in the aqueous continuous mode.

While the specific size and shape of the mixer-settler 10 will depend on the particular application involved, the following dimensions are typical for use in the recovery of uranium from wet-process phosphoric acid. The mixing chamber 12 has a transverse width of about 4 feet, a longitudinal length of about 4 feet, and a depth of about 4 feet. The settling chamber 14 has a transverse width of about 5 feet, a longitudinal length of about 18 feet, and a depth of about 4 feet. The conduit 40 of the diverter assembly 24 has a transverse width of about 5 feet, a longitudinal length of about 4 inches, and a depth measured between its inlet 42 and the bottom of its outlet 44 of about 2 feet. The feed chamber 62 of the diverter assembly 24 has a transverse width of about 5 feet, a longitudinal length of about 8 inches, and a depth of about 8 inches, the depth being equal to approximately the height of the weir 70. Using these dimensions, the length of the divider plate 52 is about 30 inches and the length of the channels 48,50 is typically about 16 inches and the length of the downstream section 54 of the conduit 40 is about 8 inches. The width of the first channel 48 is typically about 1¼ inches and the width of the second channel 50 is typically about 2¾ inches. As will be readily apparent from the above description, the length and width of the channels 48,50 can be varied to adjust the length of the downstream section 54 of the conduit 40 in which the liquids are mixed and to maintain velocities constant while adjusting the volume ratio of the liquids mixed in the downsteam section 54, respectively.

The length and width of the channels 48,50 can be simply and easily changed in accordance with the present invention to avoid the formation of an unacceptably large volume of stable emulsions and to optimize the liquid-liquid extraction system. This is accomplished by using the parameters described above in combination with a periodic monitoring of the emulsion band and the organic extractant and acid in the settling chamber 14. For example, by measuring the depth of the emulsion band which is formed at the organic-aqueous interface 78 in the settling chamber, it can be determined whether the degree of mixing is too great. More particularly, if the emulsion band exceeds a preselected depth, typically about 2 to 4 inches, the length of the conduits 48,50 is increased to decrease the length of the downstream section 54 of the conduit 40 in which the liquids are mixed. In this manner, less mixing results and less formation of stable emulsions. In addition, samples of the organic extractant and acid in the settling chamber 14 can be taken, combined and subjected to a standard batch shake-out. If uranium transfers between the phases, this is indicative that more mixing is required. Accordingly, the length of the channels 48,50 is shortened to thereby increase the length downstream section 54 of the conduit 40.

As will be readily understood by those of ordinary skill in the art, modifications may be made in the method and apparatus described above without departing from the spirit and scope of the invention. For example, other means can be employed for supplying the substantially immiscible liquids into the respective inlets 74,76 of the channels 48,50. Also, the method and apparatus of the present invention can be employed for liquid-liquid extraction of other metals from aqueous solutions such as in the field of copper and vanadium recovery from aqueous solutions using substantially immiscible organic extractants. Also, the method and apparatus of the present invention can be employed for the separation of organic derivatives from aqueous solutions by solvent extraction. Accordingly, it should be understood that the invention is not to be limited to the exact details disclosed herein, but only as defined in accordance with the appended claims.

What is claimed is:

1. An apparatus for forming a dispersion of a first liquid in a second liquid, said liquids being substantially immiscible, comprising a conduit having an upstream section divided into first and second channels of variable length and a downstream section for mixing said first and second liquids, means for varying the length of said first and second channels, means for varying the width of said first and second channels independently of said means for varying the length, means for flowing said first liquid into said first channel, and means for flowing said second liquid into said second channel whereby said liquids mix in said downstream section of said conduit to form said dispersion of said first liquid in said second liquid.

2. The apparatus of claim 1 in which said means for varying the length of said first and second channels includes a movable plate dividing said upstream section of said conduit into said first and second channels.

3. The apparatus of claim 1 in which said means for flowing said first fluid into said first channel comprises a pump.

4. An apparatus for contacting an extractant for uranium and phosphoric acid, said extractant and said phosphoric acid being substantially immiscible, said apparatus comprising a conduit having an upstream section formed into first and second separate channels of variable length and a downstream section for mixing said extractant and said phosphoric acid, means for varying the length of said first and second channels, means for varying the width of said first and second channels independently of said means for varying the length, means for flowing said extractant into said first channel and means for flowing said phosphoric acid into said second channel whereby said extractant and said phosphoric acid are mixed in said downstream section of said conduit, and a settling chamber for receiving said mixture of said extractant and said phosphoric acid.

5. The apparatus of claim 4 in which said means for varying the length of said first and second channels comprises a movable plate dividing said upstream section of said conduit into said first and second channels.

6. The apparatus of claim 4 in which said means for flowing said phosphoric acid into said second channel and the orientation of said second channel causes said phosphoric acid to flow through said second channel by gravity.

7. The apparatus of claim 4 in which said means for flowing said extractant into said first channel and the orientation of said first channel causes said extractant to flow through said first channel by gravity.

8. In a mixer-settler for forming a dispersion of a first liquid in a second liquid, said liquids being substantially immiscible, said mixer-settler having a mixing chamber and a settling chamber in which said mixing chamber overflows into an upstream end of said settling chamber, the improvement comprising conduit means mounted at said upstream end of said settling chamber, said conduit means having an inlet adjacent said mixing chamber and an outlet located in said settling chamber, said conduit means having an upstream section divided into said first and second channels and a downstream section for mixing said first and second liquids, said conduit means including means for varying the length of said first and second channels, said first channel having an inlet positioned to receive said first liquid overflowing said mixing chamber into said settling chamber, and means for flowing said second liquid into said second channel of said conduit means whereby said first and said second liquids are mixed in said downstream section of said conduit means and flow into said settling chamber.

9. The apparatus of claim 8 wherein said conduit means includes means for varying the width of said first and second channels.

* * * * *